United States Patent [19]

Foster et al.

[11] Patent Number: 4,888,801
[45] Date of Patent: Dec. 19, 1989

[54] HIERARCHICAL KEY MANAGEMENT SYSTEM

[75] Inventors: Robert I. Foster, Mesa; Robert F. Pfeifer, Scottsdale; Thomas J. Mihm, Jr., Mesa, all of Ariz.

[73] Assignee: Motorola, Inc.

[21] Appl. No.: 188,868

[22] Filed: May 2, 1988

[51] Int. Cl.$^4$ ............................................. H04L 9/02
[52] U.S. Cl. ...................................... 380/21; 380/25; 380/49
[58] Field of Search ........................... 380/21, 25, 49

[56] References Cited

U.S. PATENT DOCUMENTS

| | | | |
|---|---|---|---|
| 4,386,233 | 5/1983 | Smid et al. | 380/21 |
| 4,438,824 | 3/1984 | Mueller-Schloer | 380/25 |
| 4,458,109 | 7/1984 | Mueller-Schloer | 380/25 |
| 4,500,750 | 2/1985 | Elander et al. | 380/25 |
| 4,578,531 | 3/1986 | Everhart et al. | 380/21 |
| 4,694,492 | 9/1987 | Wirstrom et al. | 380/25 |
| 4,771,459 | 9/1988 | Jansen | 380/21 |

Primary Examiner—Salvatore Cangialosi
Attorney, Agent, or Firm—Frank J. Bogacz

[57] ABSTRACT

A hierarchical key management system includes a number of secure terminals. These terminals provide secure access to a corresponding number of users. A user inserts a security activation device or key into the secure terminal to access a secure connection through the established communication network. A group of secure wireline terminals is connected to a key certification authority. There may be several groups of key certification authorities and corresponding secure terminal users. At the highest level, a key certification center authorizes secure communications by the key certification authorities. In turn, the key certification authorities authorize secure communications between the users. As a result, if one level of key management is compromised, other levels and users are not affected.

24 Claims, 3 Drawing Sheets

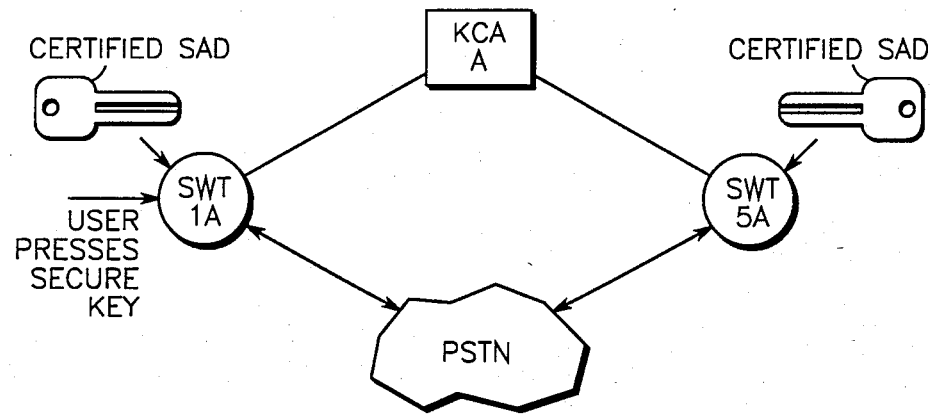
FIG. 2
FIG. 3
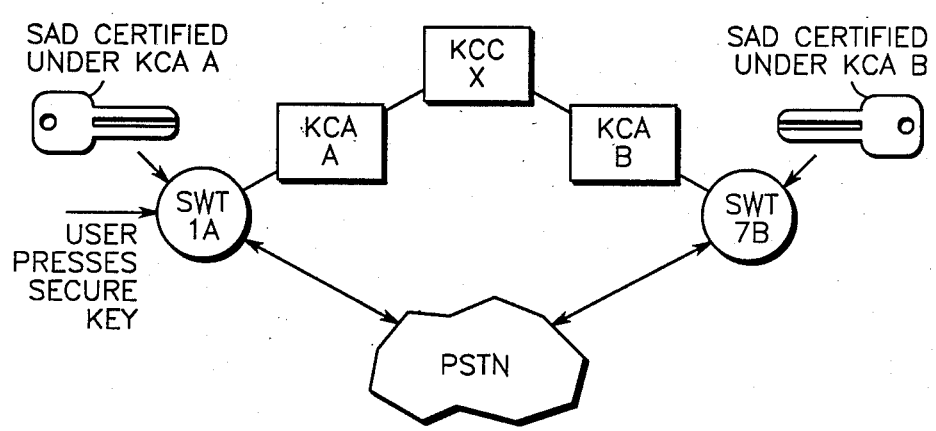

HIERARCHICAL KEY MANAGEMENT SYSTEM

BACKGROUND OF THE INVENTION

The present invention pertains to secure telecommunication systems and more particularly to an expandable hierarchical key management system which supports the delegation of authority for certification and authentication of users.

A typical key management system is shown in U.S. Pat. No. 4,578,531, issued on Mar. 25, 1986, to J. Everhart et al. This patent teaches a key distribution system connected to each of a plurality of secure terminals. When a secure data transmission is desired, each terminal must establish communication with the key distribution center. The key distribution center then establishes the terminal's credentials and performs the security analysis required.

The disadvantages of this system are that the key distribution center must be involved for each secure communication between any two terminals. The terminals exchange their security packets of information only through the key distribution center. Each terminal must send security information to the key distribution center for varification and receive subsequent information from the key distribution center. Such multiple communications are inefficient.

Further, the above-mentioned system provides no hierarchy of security. Since all critical keying data is contained at the center, if the key distribution center's security is compromised, each users' security is also compromised.

Accordingly, it is an object of the present invention to provide a hierarchical key distribution system which permits the establishing of security directly between terminal users.

SUMMARY OF THE INVENTION

In accomplishing the object of the present invention, a novel hierarchical key distribution system is shown.

A hierarchical key management system certifies a plurality of users for secure communications via the public switched telephone network. The hierarchical key management system allocates users into defined user groups.

The hierarchical key management system includes groups of terminals. Each group of terminals corresponds to one of the groups of users. Each of the terminals permits secure communications by a number of users to other ones of the users through the public switched telephone network.

The hierarchical key management system includes a plurality of key certification authorities. The key certification authorities certify users of a user group for use of the terminals for secure communications with other users of said user group.

The hierarchical key management system also includes a key certification center. The key certification center is connected to each of the plurality of key certification authorities. The key certification center grants certification authority to each of the key certification authorities and provides a means for authorizing secure communications between users of different user groups.

BRIEF DESCRIPTION OF THE DRAWINGS

FIG. 2 is a block diagram of a secure call setup between two secure wireline terminals served by the same key certification authority.

FIG. 3 is a block diagram of a secure call setup between two secure wireline terminals served by different key certification authorities, but the same key certification center.

DESCRIPTION OF THE PREFERRED EMBODIMENT

Figure 1:
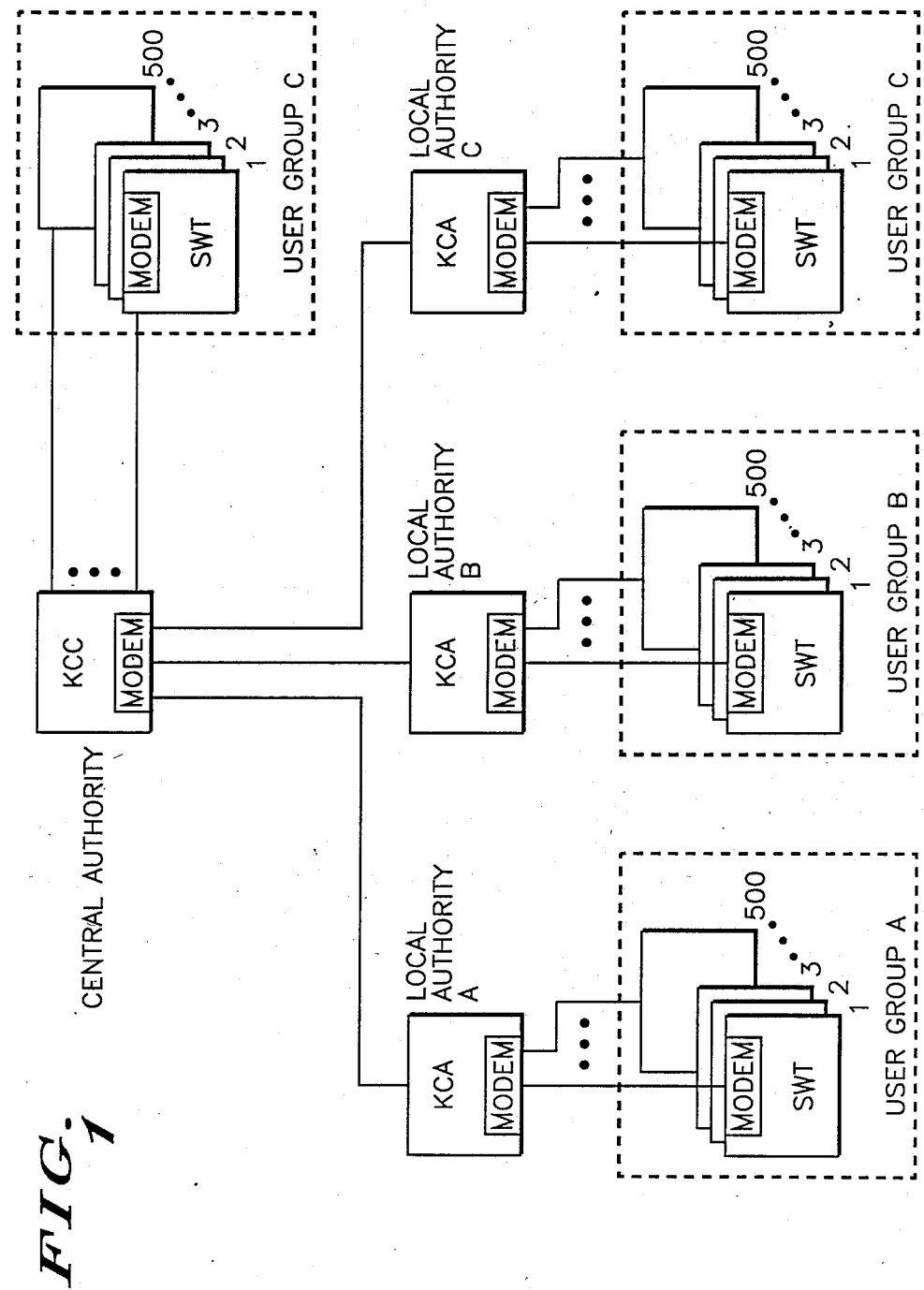
FIG. 1 is a block diagram of a key distribution system embodying the principles of operation of the present invention.

Referring to FIG. 1, a key management system heirarchy is shown. Key certification center (KCC) is the central authority of this system. The KCC may comprise a dedicated special purpose computer system which includes a keyboard, display terminal, hard disk, backup tape streamer, printer and a network interface terminal (NIT). The NIT will be explained infra.

The KCC is connected to a number of key certification authorities (KCAs). Each KCA and the KCC includes a modem which provides for high-speed telephonic connection of the KCAs and KCC via the public switched telephone network. Other communication transmission media can also be employed. Three KCAs are shown in FIG. 1 local authority A, local authority B and local authority C. However, more than three KCAs may be connected to a KCC.

Each KCA also comprises a computer system including a keyboard, display terminal, hard disk, backup tape streamer, printer and network interface terminal. Each local authority or KCA is typically responsible for providing secure communications between up to 500 users, although a KCA may handle a greater number of users. For example, local authority A provides secure communications between the users of user group A. Each of the user groups A, B and C typically comprises up to 500 secure wireline terminals (SWTs). The SWTs are connected to the KCAs via modems which provide for high-speed telephonic connection of the SWTs of a group to their KCA. Other communication transmission media can be used. A user is an individual who is certified to use one or more of the SWTs within a user group.

Each SWT generates asymmetric keys for the secure exchange of traffic keys. The SWT employs a security activation device (SAD) for terminal access and user certification. The SAD is a physical key which is initially programmed by the KCA and subsequently reprogrammed by the SWT. The SAD is inserted into a receptacle of the SWT to enable secure communications and user authentication.

The SWT generates a unique asymmetric encrypt/decrypt key pair for each user. This asymmetric key pair is certified by the local authority (KCA). For large communications systems including more than one KCA, users from one user group may desire to call users in another user group. In this case, users who call inter group must be certified by KCA's which have been registered with a common KCC.

If a user's local authority (KCA) is temporarily out of service, the KCC can perform as a backup to any of the KCAs which are out of service. This is achieved by loading the backup tape of the KCA which is out of service into the KCC.

Initially a secure communications user is issued a seed SAD and corresponding password by his local authority (KCA). The seed SAD obtains its name from being a first or initial SAD from which other security information pertaining to an individual user is generated. The seed SAD contains data relating to the user's identification, and special codes necessary for certification.

A user may be certified by inserting his SAD into an SWT. Next, the user enters a password and when prompted places a call to the KCA which is his local authority. Using this SAD and password, a user may be certified on up to 8 SWTs. Further, up to 8 users may be certified on an individual SWT. The number of users per SWT and SWTs per user are typically set at eight, but flexability is provided for a greater number of users per SWT and SWTs per user.

Once a user has been certified on a particular SWT, he may make secure calls to other users within the same local authority or to other users which share a common KCC via an automated key generation and distribution process jointly performed by the two terminals. That is, a user in USER GROUP A may call another user in USER GROUP A or a user in USER GROUP A may call a user in USER GROUP B or USER GROUP C or vice versa. Once the SWT users are certified, the users may place a normal call through the public switched telephone network (PSTN). When it is determined that the call is to be a secure call, a secure push button is depressed on the SWT. The two SWTs in the particular call exchange certification data and generate and exchange traffic keys. Secure communications may now take place. As part of this synchronization and security process, authentication information such as the identity of the other party and security level of the connection is displayed on the SWT.

At the time of certification of a user, the KCA attaches an expiration code to the user's SAD or key which is being certified. Prior to the expiration of his SAD, the user will be notified to recertify his SAD. To recertify, the user will call his local KCA using his password and SAD. During the recertification, the terminal will generate a new asymmetric key pair encrypt/decrypt which will be certified by the KCA and a new expiration attached and stored in the user's SAD. If a user fails to recertify with the KCA prior to the expiration date, the SWT will automatically deny his access to the system.

Authority is delegated throughout this key management system. The KCC and the KCA do not contain the private key of each user or SWT. Therefore, if any one of the KCAs or the KCC is compromised, all users within the key management system are not compromised. However, the compromised KCC or KCA may give false certifications.

The delegation of authority is accomplished through a process in which the KCAs become registered with the KCC. This is accomplished by using a secure procedure over the PSTN. Once a KCA is registered with a KCC, the KCA may issue registration packets as part of its certification process of individual users. These registration packets allow users to communicate securely to users in different local authority groups (USER GROUP A, B or C).

A KCA will be required to execute a recertification process with the KCC at regular intervals to certify new asymmetric domain keys and to receive global unauthorized key information. The transactions that take place between the KCA and the KCC will be similar to the transactions between a SWT and a KCA for certification, except for message content.

The KCC maintains and distributes a global unauthorized key list (UKL). The distribution of the UKL is achieved through the system hierarchy. The KCAs receive the UKL from their respective SWT users. This data, a Lockout Packet, is then transmitted to the KCC to update the global UKL. The global UKL is then distributed through the KCAs to each SWT. Secure sessions with users on the UKL is automatically prevented by the SWT. If no KCC is present in the configuration, the UKL is stored within the KCA.

From the time a seed SAD is created by the KCA until it is zeroized (cleared or reset), lost or expires, the key management system monitors, modifies and accounts for the use of that SAD. Once users have been certified by a KCA, only terminal-to-terminal transmissions are necessary to establish a secure communication link between the two SWTs. These transmissions enable a secure channel to be established between the SWTs. When the user presses a secure push button of his SWT, a series of messages is exchanged between the SWTs. Some of this information exchanged indicates the channel characteristics of the SWT's modem.

Referring to FIG. 2, a secure call between SWT user 1A and SWT user 5A is shown. SWT users 1A and 5A are indicated as certified by the same authorizing authority, that is, KCA A as shown in FIG. 2. The description that follows assumes that SWT 1A and SWT 5A have previously certified their SAD (security activation device) keys. This is indicated by the lines connecting SWTs 1A and 5A to KCA A and indicated by the CERTIFIED SAD key. At a prior time, both SWTs 1A and 5A have undergone this certification process.

SWTs 1A and 5A have previously established a connection through the public switch telephone network (PSTN). At this time, the user presses the secure push button on SWT 1A. This initiates an automatic message exchange via the PSTN that will result in a secure 2400 baud link being established between SWTs 1A and 5A. The 2400 baud link is given as an example. The data link which is established may be at any data rate practically achieved by the SWTs.

The following Table 1 lists abbreviations used for the various encrypt and decrypt vectors used hereinafter.

TABLE 1

| | |
|---|---|
| Ex | USER'S ENCRYPT VECTOR |
| Dx | USER'S DECRYPT VECTOR |
| Exa | Key AUTHORITY'S ENCRYPT VECTOR |
| Dxa | Key AUTHORITY'S DECRYPT VECTOR |
| Eax | Key AUTHORITY'S CERTIFICATION ENCRYPT VECTOR |
| Dax | Key AUTHORITY'S CERTIFICATION DECRYPT VECTOR |
| Ec | Key CERTIFICATION ENCRYPT VECTOR |
| Dc | Key CERTIFICATION DECRYPT VECTOR |
| Exts | USER'S CERTIFICATION ENCRYPT VECTOR |
| Dxts | USER'S CERTIFICATION DECRYPT VECTOR |

Each user has inserted his certified SAD key into the respective SWT. First, the two SWTs will exchange Access/Domain messages. These messages contain: an authority ID (the KCA identity), version number, an expiration date for Dax, a center ID (KCC identity), version number, expiration date for Dc, terminal type and terminal serial number. Both SWTs will examine the message transmitted and will try to match common asymmetric domain keys, either Dax or Dc. A match will occur since both SADs have been certified by the KCA.

Next, each SWT sends the other an Authentication Packet message. The Authentication Packet message contains the following information: user's ID signature (IDS), user's ID, SAD serial number (SSN), access information, terminal serial number (TSN) and the user's certified asymmetric key Ext.

Each SWT will receive the other's Authentication Packet message and decrypt it using their common domain key Dax. As a result, each SWT will extract the other's asymmetric key Ext. The other user's ID is displayed on the SWT. The ID displayed also will indicate the lowest common classification that the two user's have. If critical mismatches are found in the access information, the call will be terminated.

Next, each SWT generates two duplicate copies of one Random Component (RC) that will be used in the keying of the Kg. One copy of the RC is loaded into the local transmit Kg. The other copy of the RC is encrypted using the other USERS Ext. Each SWT then transmits a Random Component message packet to the other USER which is encrypted with the other USER Ex. When each SWT receives the other's Random Component message packet, it will decrypt it using Dxt. The random component will be and used to key the receive Kg.

Lastly, a Crypto Sync (CS) message packet is generated by each SWT. SWTs 1A and 5A then exchange Crypto Sync message packets via the PSTN. Each SWT then processes the Crypto Sync message received from the other SWT. The Crypto Sync message is processed by the receive Kg to obtain crypto synchronization. When crypto synchronization is complete, each SWT notifies its user that a secure link has been established at the appropriate baud rate.

If the transmissions between the two SWTs occur at a 2400 baud rate, the security processing mentioned above will take approximately 10 seconds. Forward error correction is used for the data exchange to minimize the effects of impairments.

Turning to FIG. 3, a secure call from SWT user 1A to SWT user 7B will be explained. SWT user 1A has been certified by KCA A. SWT user 7B has been previously certified by KCA B. This is indicated by the dashed lines between SWT 1A and KCA A and between SWT 7B and KCA B, respectively. KCA A and KCA B have previously been certified by key certification center (KCC) X. As previously mentioned, SWT 1A and SWT 7B are interconnected in an unsecure fashion through the PSTN. The user of SWT 1A presses the secure push button and as a result, the Access/Domain message packets are transmitted between SWTs 1A and 7B. Since these Access/Domain messages contain the KCC ID and version, the Access/Domain message packets will match. Secure calls between SWTs in different KCCs are not permitted under this system.

Since the match was detected on the identity of the KCC and not the KCA, the next message transmission between the SWTs will be different than that mentioned above for a common KCA. The next message packet transmitted between the SWTs in this case is called a Registration Packet. The Registration Packet contains the following information: the authorizing KCA's asymmetric domain key (Dax), the KCA's ID and access information pertinent to each KCA. The entire Registration Packet is encrypted using the KCC's domain key Ec. Each SWT will receive the other's Registration Packet and decrypt it using the common domain key Dc. As a result, each SWT will extract the other's asymmetric domain key, Dax. When each SWT determines that the other's KCC identity and version correctly match, the security processing will occur as mentioned above. If the KCC's ID and version do not match, the secure call will be terminated.

After the Registration Packet message has been properly decrypted, authentication message packets will be exchanged between SWTs 1A and 7B. The processing for the Authentication Packet message occurs as described above for the case of the common KCA. Next, the Random Component message packets are exchanged between SWTs 1A and 7B. Again, the processing is as explained above for the common KCA. Lastly, Crypto Sync message packets are exchanged between SWTs 1A and 7B and processed as mentioned above.

For the case of a secure call between SWTs in different KCA domains, but in a common KCC domain, and assuming a transmission rate of 2400 baud, the time required to set up a secure call between the two SWTs will be approximately 15 seconds.

As shown in FIG. 1, when a KCA is out of service, the KCC under which that KCA is certified may act as a backup KCA. USER GROUP BACKUP may be provided to any user group such as USER GROUP A, B or C. To accomplish this, the backup tape of the KCA which is out of service is loaded into the KCC. For certification of users in this configuration, the KCC acts as a KCA.

The initial certification of a KCA occurs in a similar fashion to that of the initial certification by a KCA of a SAD on an SWT. For the initial certification of a KCA, a secure link is established using a password and a seed SAD for that particular KCA. For example, KCA A or local authority A establishes a secure link to the central authority KCC. When the secure link is established, the KCA sends a certification information packet. This packet contains the authority's identification signature (IDS), terminal serial number (TSN), Exa, Dax and a SAD serial number (SSN).

The KCC responds to the KCA with a Registration Packet which certifies the KCA to act for the KCC in certifying users. In addition, the KCC sends to the KCA a Lockout Packet, which is the unauthorized key list and the global decryption key Dc. The Registration Packet contains newly generated asymmetric domain keys which are encrypted with the KCC's Ec. The Registration Packet also contains the KCA's identification, and access/clearance information.

When the authorization period for a particular KCA's asymmetric domain keys expires, the KCA will recertify new keys with the KCC. The recertification process is essentially the same as the initial certification process except that the global asymmetric domain key Dc is not sent by the KCC, if the certification period previously set has not yet expired.

After the certification of the user by the KCA, the particular SWT on which that user is certified generates a SAD cover component, which is randomly generated, and stores the access domain message encoded or covered by the SAD cover component in non-volatile memory of the SWT. Next, the SWT stores the authentication packet, the Registration packet the TSN (terminal serial number) and the cover component on the SAD. The SWT also stores the unauthorized key list (UKL), and the decrypt vectors Dc and Dxt covered with the same SAD cover component. With each use, the SAD cover component is updated.

Figure 4:
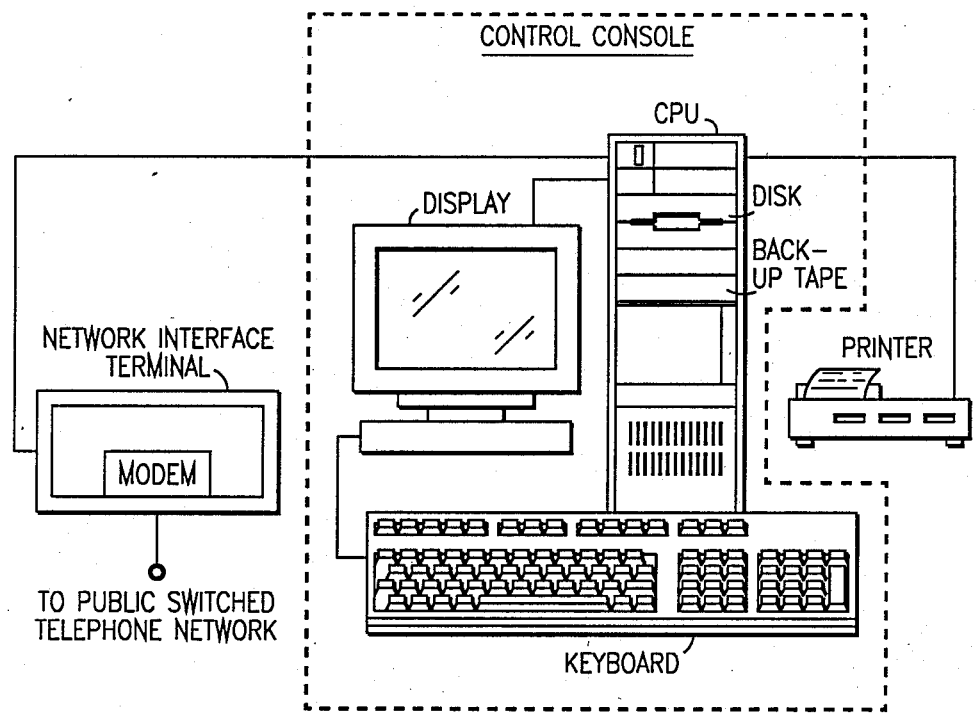
FIG. 4 is a block digram of the key certification center and key certification authority.

Referring to FIG. 4, a block diagram of a KCC or KCA is shown. Each KCA and the KCC may comprise a computer controlled system. The computer control system includes a CPU, hard disk, backup tape unit, printer, keyboard, display, and network interface terminal (NIT). The NIT is a secure wireline terminal specially adapted to interface to a KCC or a KCA. The NIT includes a modem which is connected to any user's modem, in the case of a KCA, or is connected to a KCA, in case of a KCC. Each modem connection is accomplished via the public switched telephone network.

The control console shown in FIG. 4 includes the display, the keyboard, the CPU, the hard disk, and the backup tape unit. The CPU is connected to the disk, to to the backup tape unit, to the display and to the keyboard. In addition, the printer is connected to the CPU.

Lastly, the NIT is connected to the CPU. The NIT provides for high-speed data transfer between users and a KCA or between a KCA and a KCC. The NIT also provides for high-speed communications directly between users and a KCC which is acting as a KCA in the backup mode.

Each NIT and SWT includes a modem. These modems are capable of sending data at high speeds, such as 2400 to 9600 baud, although not limited to these speeds.

The keyboard provides for data input to the CPU. The display provides for visual output from the CPU. The printer provides for hard copy visual display of CPU output. The disk provides for storing all the operating software and data base concerning the SWTs and in the case of a KCC, it stores information pertinent to the KCAs. The backup tape unit provides for loading KCA information into a KCC which is out of service so that the KCC may provide the functions of the KCA. In addition, the backup tape unit may provide for reloading the system in case of a KCA or KCC being out of service.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A hierarchical key management system for enabling ones of a plurality of users to establish secure communications via a switching network, said hierarchical key management system comprising:
   predefined user groups of said users;
   each of said users prior to communication with one another having certification by a common authority said certification comprising the generation a a set asymmetric domain keys which are encrypted and modified to include the authorization predetermined time interval for which said certification is valid;
   terminal means connected to said switching network, said terminal means for establishing secure communications through said switching network;
   groups of terminal means, each group corresponding to said group of users, a first terminal means establishing communications with a second terminal means via said switching network; and
   said first and second terminal means directly establishing secure communications via said switching network, without subsequent connection to said common authority.

2. A hierarchical key management system as claimed in claim 1, said common authority including:
   a plurality of key certification authority means for certifying said users of a user group, each of said key certification authority means corresponding to a user group and to a terminal means group, each key certification authority means certifying its corresponding users for use of said terminal means for direct secure communications with other users of said user group, each of said plurality of key certification authority means being connected to said terminal means of said corresponding group; and
   key certification center means connected to each of said plurality of key certification authority means, said certification center means for granting certification authority to each of said key certification authority means for authorizing direct secure communications between terminal means of different groups.

3. A hierarchical key management system as claimed in claim 1, wherein there is further included security activation device means corresponding to an individual user and being connectable to said terminal means, said security activation device means operating to store authentication, encryption and decryption information for transmission to said terminal means.

4. A hierarchical key management system as claimed in claim 3, said security activation device means further connected to said terminal means to enable said terminal means to program said security activation device means with certification information.

5. A hierarchical key management system as claimed in claim 1, said security activation device means being further connected to said terminal means to permit said terminal means to repetitively reprogram said security activation device means with regenerated communication information.

6. A hierarchical key management system as claimed in claim 2, wherein said users of a user group are directly connected to said key certification center means for the condition of the user group's key certification authority means being out of service.

7. A hierarchical key management system as claimed in claim 2, said terminal means including modem means for establishing said connections between said corresponding key certification authority means and said other users.

8. A hierarchical key management system as claimed in claim 7, said key certification authority means including:
   modem means connected to said key certification center means and to said users of said corresponding user group, said modem means providing high speed communication from said key certification authority means to said key certification center means and to said users of said corresponding user group; and
   computer means connected to said users of said user group via said modem means for certifying each of said users of said user group for secure communications.

9. A hierarchical key management system as claimed in claim 8, said computer means including:
   CPU means;

display means for providing visual display of information and said display means being connected to said CPU means;

keyboard means for entering information into said CPU and said keyboard means being connected to said CPU means; and printer means connected to said CPU means and said printer means providing a hard copy of information.

10. A hierarchical key management system as claimed in claim 9, said key certification center means including:

modem means connected to each of said key certification authority means, said modem means providing high speed communication between said key certification authority means and said key certification center means; and computer means connected to said key certification authority means via said modem means for certifying each of said key certification authority means for secure communications.

11. A hierarchical key management system as claimed in claim 10, said computer means including:

CPU means;

display means for providing visual display of information and said display means being connected to said CPU means;

keyboard means for entering information into said CPU and said keyboard means being connected to said CPU means; and printer means connected to said CPU means, said printer means providing a hard copy of information.

12. A method for secure communications via a switching network between at least two terminals of a plurality of terminals, each of said terminal receiving prior to communication with one another having certification said certification comprising generating a a set of asymmetric domain keys which are encrypted and modified to include the authorization predetermined time interval for which said certification is valid from a common authority, said method comprising the steps of:

completing a connection directly between said two terminals via said switching network for the transmission of information;

exchanging keying information between said two terminals under said previous certification of said common authority;

establishing without subsequent connection to said common authority a session key directly between said two terminals; and determining crypto synchronization information for each terminal, to allow secure communications directly between said two connected terminals.

13. A method for secure communications as claimed in claim 11, wherein there is further included the step of inserting a security activation device into said terminals for insuring that each user of the corresponding terminal is certified for secure communications.

14. A method for secure communications as claimed in claim 12, wherein there is further included the step of verifying information contained on said security activation device by said terminal to insure that said user is presently certified.

15. A method for secure communications as claimed in claim 14, said step of exchanging including the steps of:

first transmitting an access/domain message from one terminal to another terminal;

first receiving an access/domain message from said other terminal; and first comparing said transmitted access/domain message with said received access/domain message to determine whether said messages have a common key certification center or key certification authority.

16. A method for secure communications as claimed in claim 15, said step of exchanging further including the steps of:

second transmitting a registration message from said one terminal to said other terminal;

second receiving said registration message from said other terminal; and first extracting an asymmetric domain key of said other terminal.

17. A method for secure communications as claimed in claim 16, wherein said step of exchanging further includes the steps of:

third transmitting an authentication message from said one terminal to said other terminal;

third receiving said authentication message of said other terminal; and second extracting an asymmetric encrypt key from said received authentication packet.

18. A method for secure communications as claimed in claim 17, said step of exchanging further including the step of generating a random component for encrypting transmit and receive keys.

19. A method for secure communications as claimed in claim 18, said step of exchanging further including the steps of:

fourth transmitting a random component message from said one terminal to said other terminal;

fourth receiving said random component message of said other terminal; and third extracting said receive key from said random component message.

20. A method for secure communications as claimed in claim 19, wherein said step of exchanging further includes the steps of:

fifth transmitting a crypto synchronization message from said one terminal to said other terminal; and fifth receiving said crypto synchronization message from said other terminal.

21. A hierarchical key management system for establishing secure communications between at least two users of a plurality of users via a switching network, said hierarchical key management system comprising:

key certification means said key certification means comprising means for the generation a a set of asymmetric domain keys which are encrypted and modified to include the authorization predetermined time interval for which said certification is valid;

predefined user groups of said users;

terminal means connected to said key certification mans for certifying said users of prior to communication with one another;

groups of terminal means, each group corresponding to said groups of users, each said terminal means permitting direct secure communications between users of said plurality through said switching network; and key certification means for off-line certification of said users for user of said terminal means for on-line secure communications between said at least two users without subsequent connection to said key certification authority.

22. A hierarchical key management system as claimed in claim 12, said terminal means including means for communication between said key certification authority means and said users.

23. A hierarchical key management system as claimed in claim 12, said key certification authority means including means for communication between said key certification center means and said terminal means.

24. A hierarchical key management system as claimed in claim 12, said key certification center means including means for communication between said key certification center means and said terminal means.

* * * * *

UNITED STATES PATENT AND TRADEMARK OFFICE
CERTIFICATE OF CORRECTION

PATENT NO. : 4,888,801

DATED : December 19, 1989

INVENTOR(S) : Robert I. Foster, et al

It is certified that error appears in the above-identified patent and that said Letters Patent is hereby corrected as shown below:

In col. 7, claim 1, line 58, after "set" insert --of--.

In col. 10, claim 21, line 59, delete "mans" and substitute --means--.

In col. 10, claim 21, line 59, after the word "of" insert --said terminal means--.

Signed and Sealed this

Tenth Day of September, 1991

Attest:

HARRY F. MANBECK, JR.

Attesting Officer

Commissioner of Patents and Trademarks